United States Patent [19]

Neal

[11] Patent Number: 5,134,490
[45] Date of Patent: Jul. 28, 1992

[54] BEAM CURRENT LIMITER WITH BRIGHTNESS CONTROL THRESHOLD EXTENSION

[75] Inventor: Charles B. Neal, Zionsville, Ind.

[73] Assignee: Thomson Consumer Electronics, Inc., Indianapolis, Ind.

[21] Appl. No.: 339,841

[22] Filed: Apr. 18, 1989

[51] Int. Cl.⁵ .................... H04N 5/19; H04N 5/59
[52] U.S. Cl. .................... 358/168; 358/169; 358/74; 358/243
[58] Field of Search ............ 358/243, 168, 169, 74, 358/34

[56] References Cited

U.S. PATENT DOCUMENTS

| | | | |
|---|---|---|---|
| 3,674,932 | 7/1972 | Griepentrog | 178/7.5 |
| 3,804,981 | 4/1974 | Avins | 358/168 |
| 3,873,767 | 3/1975 | Okada et al. | 358/243 |
| 4,126,884 | 11/1978 | Shanley | 358/21 R |
| 4,137,552 | 1/1979 | Serafini | 358/243 |
| 4,253,110 | 2/1981 | Harwood et al. | 358/243 |
| 4,253,121 | 2/1981 | Avery | 358/243 |
| 4,356,508 | 10/1982 | Okada | 358/29 |
| 4,947,253 | 8/1990 | Neal | 358/243 |
| 4,982,287 | 1/1991 | Lagoni | 358/168 |

Primary Examiner—Tommy P. Chin
Attorney, Agent, or Firm—Joseph S. Tripoli; Joseph J. Laks; Harvey D. Fried

[57] ABSTRACT

A brightness limiter is responsive to a beam current control signal in a predetermined range of beam current operating values with an extended operating threshold for reducing brightness and reducing beam current. Operation of the brightness limiter responsive to certain noise in the beam current control signal during retrace is inhibited, the brightness limiter being otherwise responsive to the beam current control signal at operating values below the threshold. Operation of the brightness limiter may be inhibited by passing the beam current control signal through an AC filter. Alternatively, operation of the brightness limiter may be inhibited during retrace by interrupting propagation of the beam current control signal, or by preventing operation of the brightness limiter, for example, responsive to flyback pulses or pulses in timed relationship to flyback pulses.

37 Claims, 6 Drawing Sheets

BEAM CURRENT LIMITER WITH BRIGHTNESS CONTROL THRESHOLD EXTENSION

This invention relates generally to electron beam current limiting in kinescopes of television receivers, video monitors and the like. More particularly, the invention relates to the field of electron beam current limiting in conjunction with controlling image characteristics such as contrast and brightness over an extended range.

This application is related to copending and commonly owned application Ser. No. 339,847, now U.S. Pat. No. 4,947,253, filed concurrently herewith and entitled BRIGHTNESS MODULATOR FOR CLOSED LOOP COMPENSATION OF BLACK LEVEL, the teachings of which are incorporated herein by reference.

In most television receivers the display device is a cathode ray tube whose high voltage power is provided from the horizontal deflection system by rectifying the pulses generated during successive horizontal scan retraces. Power drawn from the supply is a function of picture content, customer setting of black level (or brightness); video gain (or contrast or picture) controls; and, the effect of whatever form or forms of automatic video gain and/or automatic black level control may be implemented. Power is drawn during active picture time and replenished during horizontal retrace time. The likelihood of high beam current being produced increases in the presence of video signals representative of bright images containing predominantly white information, manual contrast or brightness control settings at a maximum position, or a combination of these factors.

Excessive beam current may cause a receiver to produce a degraded image and may cause a receiver to be damaged. Excessive beam current may adversely effect performance of receiver's deflection system, may cause electron beam spot defocusing and may result in picture blooming. Accordingly, receivers are usually provided with an automatic beam limiter circuit. Such a circuit senses beam current, and automatically reduces contrast or brightness levels, or both, when beam current increases beyond a predetermined value.

Typically, a horizontal deflection system includes a flyback transformer. A voltage proportional to the beam current is developed across a resistor connected from the lower end of a secondary winding of the flyback transformer to a source of reference potential. The voltage at the terminal of the resistor not coupled to the reference potential is actively compared against another reference in a control circuit. When a desired maximum beam current is reached, action is taken to reduce video gain, or contrast, so as to limit the current. Further protection against excessive beam current often is provided by an additional circuit designed to reduce black level, or brightness, after video gain has been reduced by some predetermined amount. The additional circuit can be similar in structure and coupled in parallel to the gain control, using the same beam sense voltage for the different comparator reference, so that action to reduce black level starts at a higher beam current than action to reduce video gain. Alternatively, the additional circuit can be coupled serially to the gain control, and be designed to begin operation when the output of the gain control reaches a predetermined degree of video gain reduction.

Automatic brightness limiting may present problems even for levels of beam current which are not necessarily excessive. A beam current limiter should function without unnecessarily increasing a viewer's perception of changes in image content due to operation of the beam limiter. Generally speaking, a viewer can often perceive changes in the background illumination of an image produced by changes in image brightness more readily than image contrast. Moreover, reducing black level, or brightness, under normal picture conditions is undesirable because it results in cutting off low light detail in the scene, assuming black level was set correctly initially. Accordingly, beam current limiting in safe ranges of beam current levels is preferably effected by limiting contrast. However, automatic beam current limiting circuits are generally susceptible to noise and frequently operate prematurely reduce brightness, and thereby image quality, before beam current levels become excessive.

Various automatic beam current limiter systems are known which operate in conjunction with contrast and brightness control circuits of a television receiver and the like. Many systems provide for progressive control of contrast and brightness over predetermined ranges of beam current, but none provide for extending the useful control range of contrast adjustment before limiting brightness, or black level, in a manner that perceptibly degrades image quality. Sequential and progressive beam limiter systems are described in the following U.S. Pat. Nos.: 4,126,884 - Shanley, II; 4,253,110 - Harwood, et al.; 4,253,121 - Avery; and, 4,137,552 - Serafini.

It is an aspect of this invention to provide control of contrast and brightness levels responsive to beam current levels in a first, safe and extended range of beam current levels.

It is a further aspect of this invention to reduce brightness levels responsive to values of beam current levels in a second range of levels with an extended threshold of operation.

It is another aspect of this invention to delay onset of brightness limiter control, but thereafter, to effect rapid reduction of beam current.

It is yet another aspect of this invention to control contrast over an extended range of beam current values responsive to a control signal, and to control brightness limiting in a further range of beam current values, responsive to a processed variation of the same control signal.

It is yet another aspect of this invention to control brightness limiting only during horizontal trace times and to prevent control of brightness limiting during horizontal retrace times.

A video control circuit in accordance with the foregoing aspects of this invention may comprise a gain controllable video amplifier for a video signal, the amplified video signal generating a picture having contrast and brightness characteristics which both vary directly with the gain of the amplifier, and a brightness control circuit for varying the brightness of the amplified video signal without affecting the contrast. A beam current sensing circuit is used to develop a beam current control signal related, for example, to an average picture intensity level. An automatic contrast control circuit and an automatic contrast limiter are coupled to the amplifier. The automatic contrast control circuit is continuously responsive to the video signal, and in particular, to peaks in the video signal which will cause brief peaks in the beam current which do not significantly affect the average value of the beam current. In this respect, the video signal is an indirect measure of peaks in the beam current. The contrast limiter is continuously responsive to the beam current control signal, which does not generally reflect peak conditions, but average values. The contrast control and contrast limiter may be thought of as being responsive to different aspects of beam current values, indirectly and directly, in a first and extended range of beam current operating values. Each of the contrast control and contrast limiter develops a component of a video gain control signal for continuously varying the gain of the video amplifier to adjust the contrast and control beam current. A brightness modulator is coupled to the brightness control circuit and is responsive to the video gain control signal for developing a brightness control signal, for example, for continuously adjusting the brightness of the video signal inversely with the contrast, thereby increasing the brightness of both white and dark portions of the picture when the entire picture has a sufficiently large average picture intensity level to cause the contrast control circuit to effect reduction of the contrast and the brightness.

In order to maximize the effective range over which contrast control and brightness modulation are effective, without at the same time preventing timely operation of the brightness limiter, the beam current control signal is processed to remove certain characteristic noise signals, for example by filtering or gating, which do not significantly alter the average level of sensed beam current, but which engender premature operation of the brightness limiter. The brightness limiter is therefore operated responsive to a processed beam current control signal, to preclude undesirable operation of the brightness limiter when the beam current is in the first and extended range of operating values.

It is yet another aspect of this invention to provide a beam limiter in a video control circuit which provides for an extended range of contrast control and brightness modulation, and which is compatible with manual contrast and brightness controls.

These and other aspects of the invention may be better understood with reference to the drawings, in which.

Figure 1:
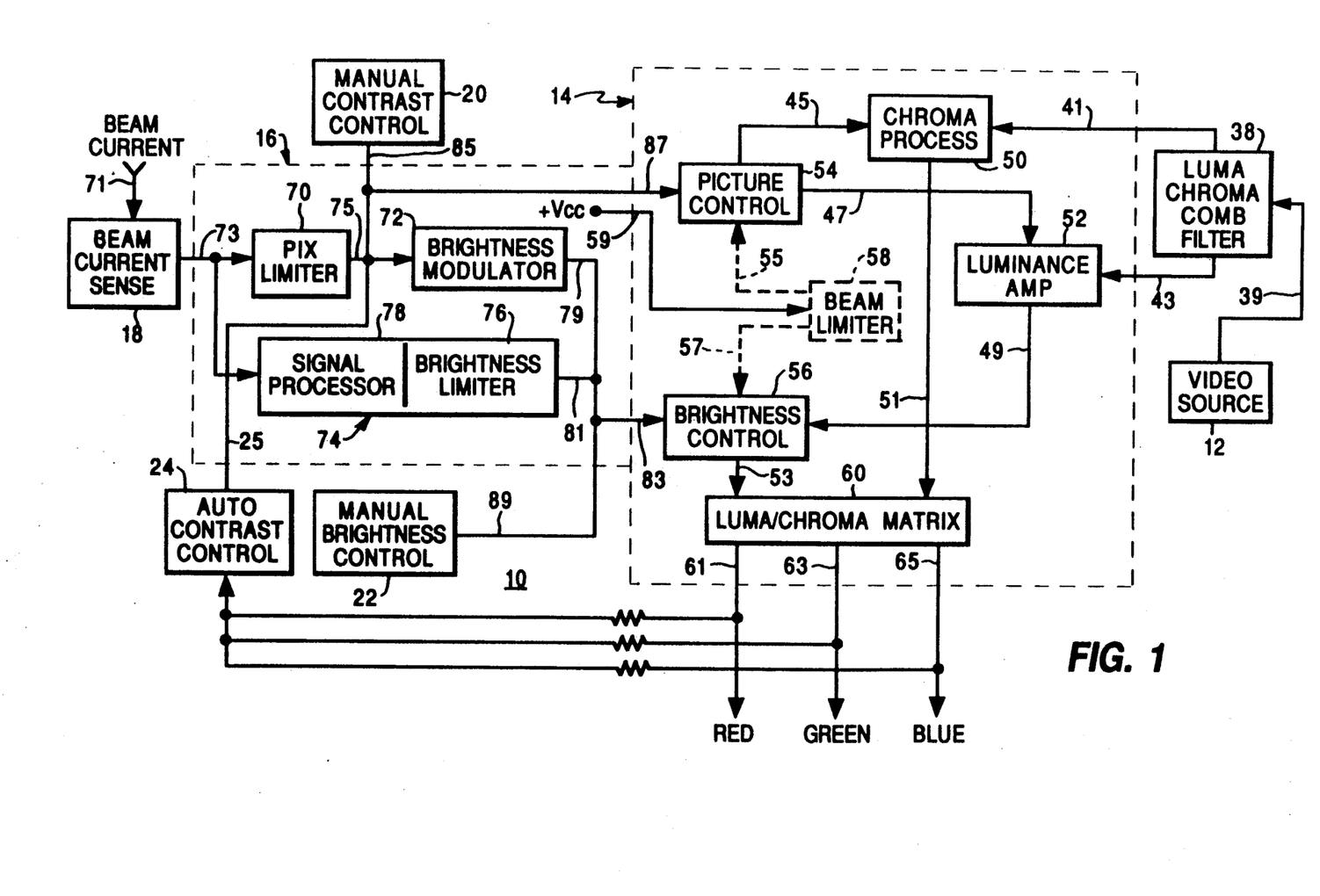
FIG. 1 is a block diagram of a video control circuit in accordance with this invention.

A video control circuit is shown in block diagram form in FIG. 1 and generally designated by reference numeral 10. The video control circuit 10 comprises a video source 12, a luma/chroma processing circuit 14, a beam current limiter circuit 16, a beam current sensing circuit 18, a manual contrast control circuit 20, an automatic contrast control circuit 24 and a manual brightness control circuit 22.

The output of the video source 12 on line 39 is an input to a luma/chroma comb filter 38. The output of the comb filter on line 41 is chrominance information and the output of the comb filter on line 43 is luminance information. The outputs of the comb filter 38 are inputs to the luma/chroma processing circuit 14. Such circuits as the luma/chroma processing circuit 14 may be embodied as integrated circuits. Such a luma/chroma processing chip is available as RCA part no. 1421882-1, Thomson Consumer Electronics, Indianapolis, Ind. Only those portions of such a luma/chroma chip as are pertinent to this invention are illustrated.

The chrominance output of the comb filter 38 is an input to a chroma processing circuit 50. The luminance output of the comb filter 38 is an input to a luminance amplifier 52. A picture control circuit 54 controls video gain of the luminance and chrominance channels, and has outputs on lines 45 and 47, which are inputs respectively to the chrominance processing circuit 50 and the luminance amplifier 52. The output of the luminance amplifier 52 is an input to a brightness control circuit 56. Brightness control circuit 56 raises and lowers the brightness level, also termed black level. The output of the brightness control circuit 56 on line 53 and the output of the chroma processing circuit 50 on line 51 are inputs to a luma/chroma matrix 60. The outputs of the luma/chroma matrix 60 on lines 61, 63 and 65 provides output for the red, green and blue video signals, respectively. Each of the outputs on lines 61, 63 and 65 is passed through a resistor, after which the outputs are summed as an input to a conventional automatic contrast control circuit 24. This enables beam current limiting to be effected responsive to video peak intensity, as well as average picture intensity. This can prevent localized defocusing and blistering of the shadow mask.

A video signal is generally clamped to a DC level at 0 IRE (back porch of the composite video signal), whereas the black level in NTSC signals is nominally adjusted to be approximately 7.5 IRE. White level is nominally 100 IRE. Accordingly, an increase in video gain causes the displayed black level to move "brighter" as video gain is increased and causes the displayed black level to move "darker" as video gain is decreased. When beam current limiting circuits also respond to increases in beam current levels by reducing brightness, that is lowering the black level, the effect can be pronounced.

The picture control circuit has an input on line 87. The brightness control circuit 56 has an input on line 83. For purposes of definition, and in accordance with operation of the integrated circuit chip identified above, an increase in a voltage level applied to input line 87 of picture control 54 will increase the gain of the video amplifier. The increase in video gain will therefore increase the contrast level and increase, or raise, the brightness level. A reduction in the voltage on line 87 will cause a reduction in video gain, which will result in a reduction of the contrast level and a reduction of the brightness level. Similarly, an increase of voltage on input line 83 to brightness control 56 will be effective to raise the brightness level of the video signal, and a reduction of voltage on line 83 will be effective to lower the brightness level. However, variations of the voltage level on input line 83 to brightness control circuit 56 will not affect the video gain, and accordingly, will not change the contrast level.

In the particular embodiment which is disclosed in the drawings, which utilizes a luma/chroma chip as identified above, a beam limiter circuit 58 is also provided. Beam limiter circuit 58 is shown by a block drawn in phantom, because it is not utilized in the invention. In order to render the beam limiter 58 ineffective, its input on line 59 is permanently coupled to a substantially uniform and raised voltage level +Vcc. This indicates, albeit falsely, that beam current is very low. When the input to beam limiter circuit 58 is thus tied high, its outputs on lines 55 and 57, to the picture control 54 and brightness control 56 respectively, are unchanging and of no effect. In this manner it is possible to disable the integrated beam limiter circuit 58, and substitute the beam limiter circuit 16 to which an aspect of this invention is directed.

The specific operation of the luma/chroma comb filter, the chroma processing circuit, the luminance amplifier and the luma/chroma matrix are known, and accordingly, are neither shown nor explained in detail. The operation of the beam limiter circuit 58, which is bypassed, was in accordance with a prior art scheme, which adjusted contrast and brightness in the same direction in a first range of beam current levels, and in a higher range of beam current levels than in the first range, adjusted brightness level. It is the less than optimum operation of such a beam limiter circuit, which prompted the development of the beam limiter circuit taught herein.

Figure 2:
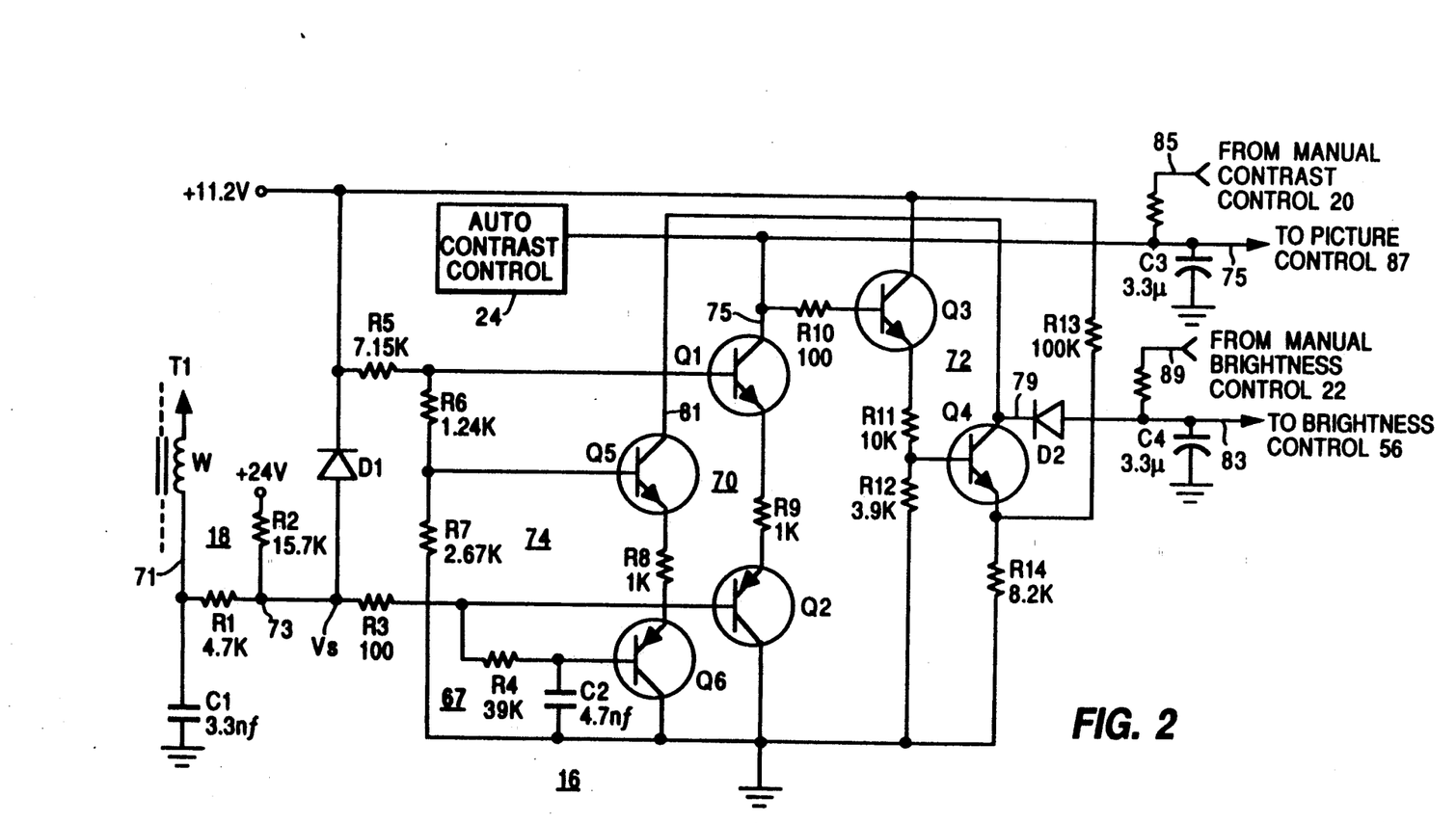
FIG. 2 is a circuit schematic for the beam current limiting circuitry shown in FIG. 1, wherein the signal processor for the beam current control signal is a filter.
Figure 6:
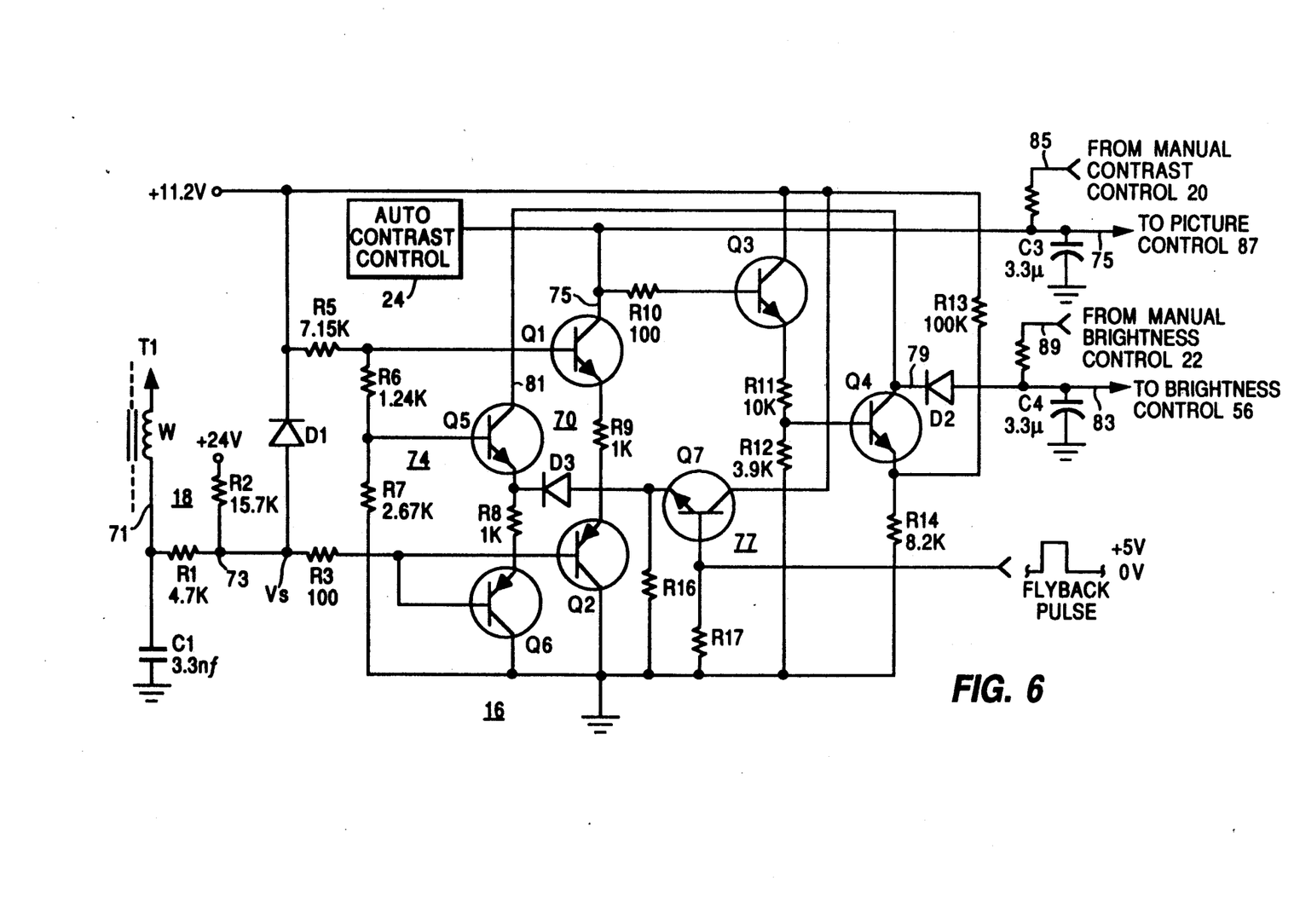
FIG. 6 is a schematic for a beam current limiting circuit wherein the signal processor is a gate control; and, FIG. 7 is an alternative circuit to that shown in FIG. 6.
Figure 7:
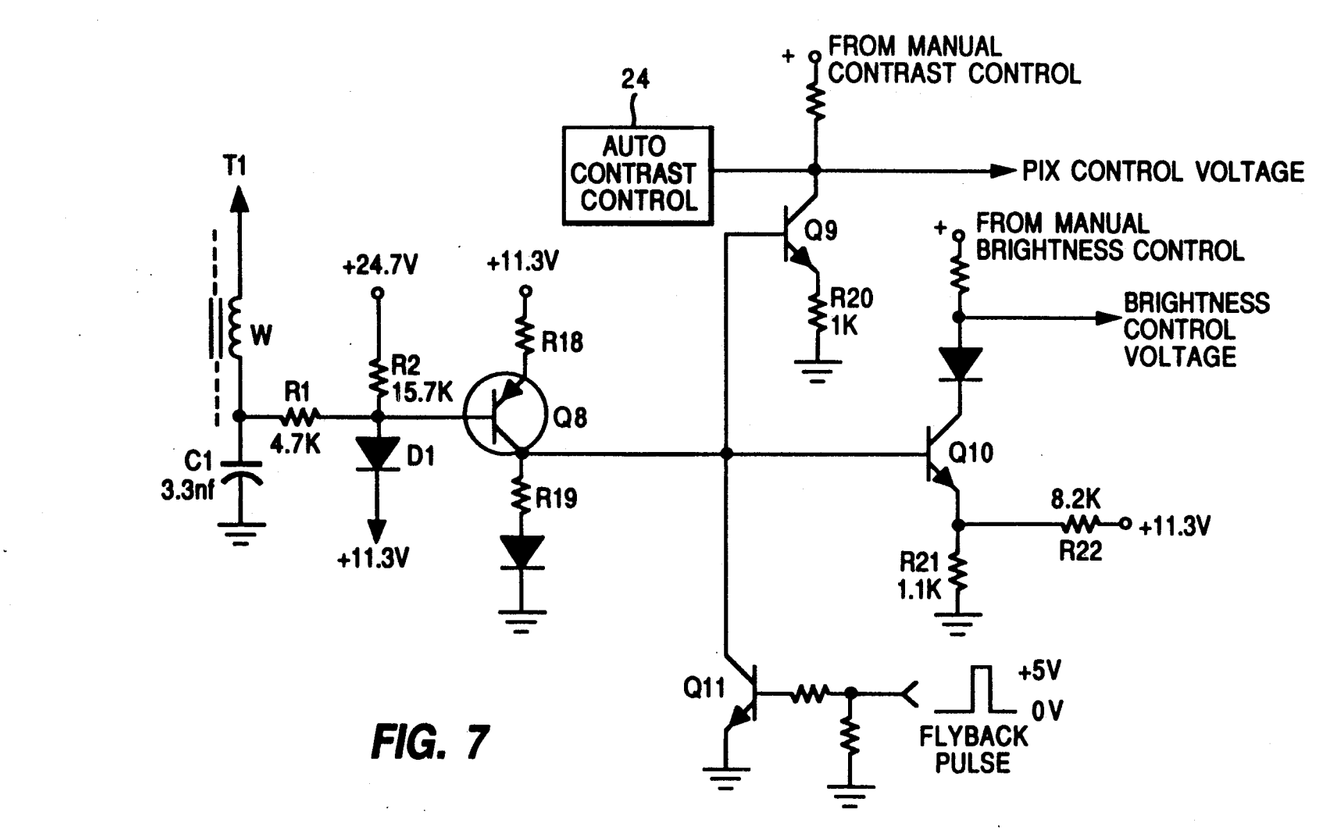

Electron beam current on line 71 is monitored by beam current sensing circuit 18. Beam current sensing circuit 18 develops a beam current control voltage on line 73, which is an input to a contrast, or "pix", limiter circuit 70 and a beam current control 74. Beam current control 74 comprises a brightness limiter 76 and a signal processor 78. Signal processor 78 may take different forms, for example, a filter as shown in FIG. 2 or a gate control as shown in FIGS. 6 and 7. In either case, the signal processor 78 is a means for removing at least certain characteristic noise from the input to the brightness limiter 76. In accordance with the circuit schematic shown in FIG. 2, the beam current control signal is a voltage signal, which is at a maximum when beam current is at minimum, and is at a minimum when beam current level is at maximum.

Figure 4:
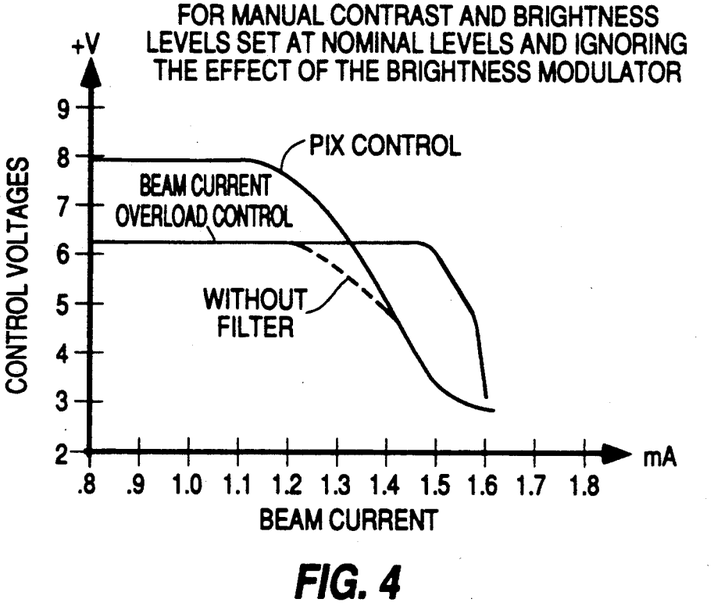
FIG. 4 is a graph illustrating variation of the contrast level control voltage and the beam current overload control voltage as a function of beam current.

The pix limiter circuit 70 is an automatic contrast limiting circuit, which develops one component of a contrast, or pix, control voltage on output line 75 responsive to dynamic variations of beam current related to average picture intensity. Another component of the pix control voltage is the output of the automatic contrast control 24 on line 25, responsive to dynamic variations of beam current related to peak picture intensity. A third component of the pix control voltage is the output of the manual contrast control 20 on line 85. The pix control voltage on line 75 is an input to a brightness modulator circuit 72 and the input line 87 of picture control circuit 54. A net increase of the pix control voltage, due to any or all of its components, causes the picture control circuit 54 to increase the video gain, which increases the contrast level and raises the brightness level. A net decrease in the pix control voltage causes the picture control circuit 54 to reduce the video gain, decreasing contrast and lowering the brightness level. The pix control voltage varies as a function of beam current responsive to the pix limiter 70 as shown in FIG. 4. In order to highlight operation of the pix limiter, the effect of the brightness modulator is ignored in FIG. 4. The values correspond to operation of the specific circuit shown in FIG. 2. At lower values of beam current than shown in FIG. 4, the pix control voltage varies conventionally, for the most part, responsive to the auto contrast control 24.

Figure 5:
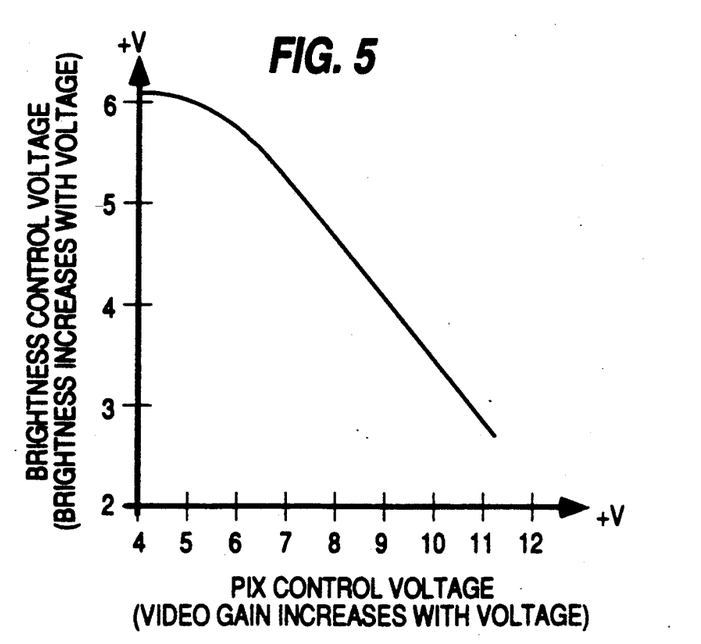
FIG. 5 is a graph illustrating variation of the brightness control voltage produced by the brightness modulator as a function of the contrast control voltage.

The brightness modulator circuit 72 provides an output control voltage on line 79 which varies inversely with the pix control voltage, as illustrated in FIG. 5. The values correspond to operation of the specific circuit shown in FIG. 2. When the pix control voltage increases, the voltage of the brightness control signal on line 79 decreases, which causes the brightness control circuit 56 to lower the brightness level. Conversely, when the pix control voltage falls, the brightness control voltage rises, causing the brightness control circuit 56 to raise the brightness level. Increasing the video gain increases the contrast level, and at the same time, raises the brightness level. Conversely, reducing the video gain reduces the contrast level and lowers the brightness level. The brightness control signal is therefore effective to raise the brightness level when the contrast level is reduced and to lower the brightness level when the contrast level is increased. The brightness modulator therefore counteracts the particularly undesirable reduction of the brightness level when the contrast is decreased responsive to auto contrast control or beam current limiter operation.

The brightness modulator 72 is effective in a first range of beam current operating values, corresponding generally to safe operating conditions. However, there are certain circumstances wherein perceived image quality is less important than the dangers of excessive beam current levels. Accordingly, the brightness limiter circuit 76 is effective in a second range of beam current operating values, corresponding generally to unsafe operating conditions, that is, where neither the auto contrast control 24 nor the pix limiter circuit 70 is effective to prevent unsafe beam current levels. Under these circumstances, the brightness limiter circuit 76 develops a beam current overload control voltage signal on line 81, which is also coupled to input line 83 of brightness control circuit 56. The beam current overload control signal is also shown in FIG. 4, as a function of beam current. In order to highlight operation of the brightness limiter, the effect of the brightness modulator is ignored in FIG. 4. It will be appreciated that, at a certain threshold value of beam current, the pix limiter 70 will have reached its full range of adjustment, so that no further changes on the input to the picture control circuit or from the brightness modulator circuit will take place. The beam current overload control signal is thereafter effective in the second range to lower the brightness level to prevent unsafe beam current levels.

In order to prevent the brightness limiter circuit 76 from generating the beam current overload control signal when the auto contrast control or the pix limiter should still be capable of controlling the beam current by controlling the video gain, the beam current control signal is passed through the signal processor 78 to remove AC components therefrom, for example noise spikes resulting from retrace pulses. This helps assure that the brightness limiter circuit 76 will become effective only when the full and extended range of compensation provided by the pix control voltage has been exhausted. The dash line curve in FIG. 5 shows the premature effect of the brightness limiter without the signal processor.

Most television receivers provide manually adjustable means whereby viewers may alter the contrast and brightness settings. As noted, the output of the manual contrast control circuit 20 is also coupled to the input of the brightness modulator 72, which will be effective to reduce the brightness level responsive to a manual increase of contrast. As in the automatic beam limiter circuit 16, the manual brightness control 22 will raise and lower the brightness level without affecting video gain and contrast level. However, the voltage level on output line 89 will be a component of the input to the brightness control circuit 56, and an unduly high manually adjusted brightness level will result in a reduced effective range of the pix control and brightness modulator, and will result in more frequent operation of the brightness limiter circuit.

A circuit schematic for a suitable beam limiter circuit 16 in accordance with this invention is shown in FIG. 2. An electron beam current flows through line 71 and into winding W of flyback transformer T1. A beam current sensing circuit 18 includes resistors R1 and R2, the junction of which corresponds to line 73, on which a beam current control voltage Vs is developed. Beam current control voltage Vs varies inversely with beam current. Diode D1 is connected between output line 73 and a supply voltage, for example +11.2 volts. This limits the maximum value of voltage Vs to approximately +12 volts.

The pix limiter circuit 70 comprises transistors Q1 and Q2, the emitters of which are coupled to one another through resistor R9. The base of resistor Q1 is biased by a voltage divider network comprising resistors R5, R6 and R7. For the component values shown, the base of transistor Q1, which is coupled to the junction of resistors R5 and R6, is biased at a voltage level of approximately +4 volts.

The auto contrast control circuit 24 may be embodied as a variety of specific circuits, for example as taught in U.S. Pat. No. 4,599,643, incorporated herein by reference. One such embodiment comprises a transistor. The transistor has a base electrode coupled to the summed video outputs, a collector electrode coupled to the outputs of the pix limiter and the manual contrast control and an emitter electrode coupled by a resistive voltage divider network to a biasing voltage. An increase of video drive (amplitude) will effect reduction of the pix control voltage.

The brightness limiter circuit 76 comprises transistors Q5 and Q6, the emitters of which are coupled to one another through resistor R8. The base of transistor Q5 is also biased by the voltage divider network comprising resistors R5, R6 and R7. For the component values shown, the base of transistor Q5, which is coupled to the junction of resistors R6 and R7, is at approximately +2.7 volts. Signal processor 78, in the form of a filter 67, is coupled to the base of transistor Q6 and comprises resistor R4 and capacitor C2.

The brightness modulator circuit 72 comprises transistors Q3 and Q4. The base of transistor Q4 is biased by the voltage divider network comprising resistors R11 and R12, and is coupled to the junction thereof. The voltage at the emitter of transistor Q3 follows the voltage on the base thereof, and is essentially the pix control voltage. The collector of transistor Q1 is the output of the pix control circuit 70, and corresponds to output line 75. Output line 75 is an input to the picture control circuit 54 and, through resistor R10, is also an input to the brightness modulator circuit 72 at the base of transistor Q3.

The collector of transistor Q5 is the output of the brightness limiter circuit 76, and corresponds to output line 81. This is coupled to the collector of transistor Q4, which is the output of the brightness modulator 72, and corresponds to output line 79. Diode D2 does not form part of the brightness limiter or brightness modulator, but prevents conduction of transistors Q4 and Q5 when the customer, or manual, brightness control is set abnormally low. Resistor R5 of the voltage divider network, the collector of transistor Q3 and one terminal of resistor R13 are coupled to the supply voltage +11.2 volts. Resistor R13 and resistor R14 form a voltage divider network for biasing the emitter electrode of transistor Q4, which is coupled to the junction thereof. When transistor Q3 is not conducting, the emitter electrode of transistor of Q4 is at a voltage level of approximately +0.85 volts.

The manual contrast control circuit will result in a voltage level on input line 75 to the picture control circuit, which voltage will also appear at the collector of transistor Q1, which is the output of the pix control circuit 70. Assuming, for example, that beam current is at a minimum and that the voltage Vs is at a maximum, a nominal factory setting of the manual contrast control, for the component values illustrated, will generate a voltage level of approximately +7.8 volts on line 75 at the input to the picture control circuit and on the collector of transistor Q1. Transistor Q3 is biased in such a fashion that it will conduct responsive to pix control voltages in excess of approximately +5 volts. Accordingly, even in the absence of any beam current limiting resulting from the level of voltage Vs, transistor Q3 will conduct, which in turn will cause transistor Q4 to conduct, which will set the output of the brightness modulator on line 83 to approximately +6.1 volts. This corresponds to the maximum brightness control voltage shown in FIG. 4, wherein the effect of the brightness modulation is ignored.

Voltage Vs will fall as beam current rises. The auto contrast control will be effective, and predominate, before enough beam current flows to turn on transistor Q2. When voltage Vs falls low enough to forward bias the base emitter junction of transistor Q2, which will be approximately two diode drops below the +4 volts bias voltage on the base of transistor W1, transistor Q1 will begin to conduct. As transistor Q1 begins to conduct, the pix control voltage on output line 75 will be pulled down. As the pix control voltage falls, the video gain will be reduced, and the contrast level will be reduced. Reduction of the video gain will also lower the brightness level, as explained above. However, as the pix control voltage falls, the voltage at the base of transistor Q3 will fall, which will reduce the conduction of transistor Q3. Less conduction of transistor Q3 will result in less conduction of transistor Q4, which will cause the voltage level at the collector of Q4 on output line 79 to increase. Accordingly, the brightness control signal will increase, and raise the brightness level to compensate for the reduction in video gain.

The value of voltage Vs at which the pix control circuit becomes effective will depend upon the values of resistors R5, R6 and R7, which set the bias voltage at the base of transistor Q1, which in turn sets the bias voltage for the emitter of transistor Q2. As voltage Vs falls further, with increasing beam current, the pix control voltage at the collector of transistor Q1 will continue to fall and the brightness control voltage at the collector of transistor of Q4 will continue to increase.

Ideally, the brightness limiter circuit will become effective when the voltage Vs becomes small enough, but not before. More particularly, the voltage divider formed by resistors R5, R6 and R7 sets the bias voltage at the base of transistor Q5, which in turn sets the bias voltage at the emitter of transistor Q6. When voltage Vs falls approximately two diode drops below +2.7 volts, transistor Q6 will begin to conduct, which causes conduction of transistor Q5. As transistor Q5 begins to conduct, the brightness control signal at the output of the brightness modulator, namely the collector of transistor Q4, will be pulled down. This will cause the brightness control to lower the brightness level to reduce beam current. The further voltage Vs falls, the lower the brightness level will be pulled.

The auto contrast control 24 and the contrast limiter 70 may be thought of as operable in different parts of a first range of beam current values, with the brightness limiter being operable in a second range of beam current values beyond the first range. Alternatively, the auto contrast control may be thought of as operable in a first range of beam current values, the contrast limiter as operable in a second range of beam current values and the brightness limiter as operable in a third range of beam current values beyond the first and second ranges.

Figure 3:
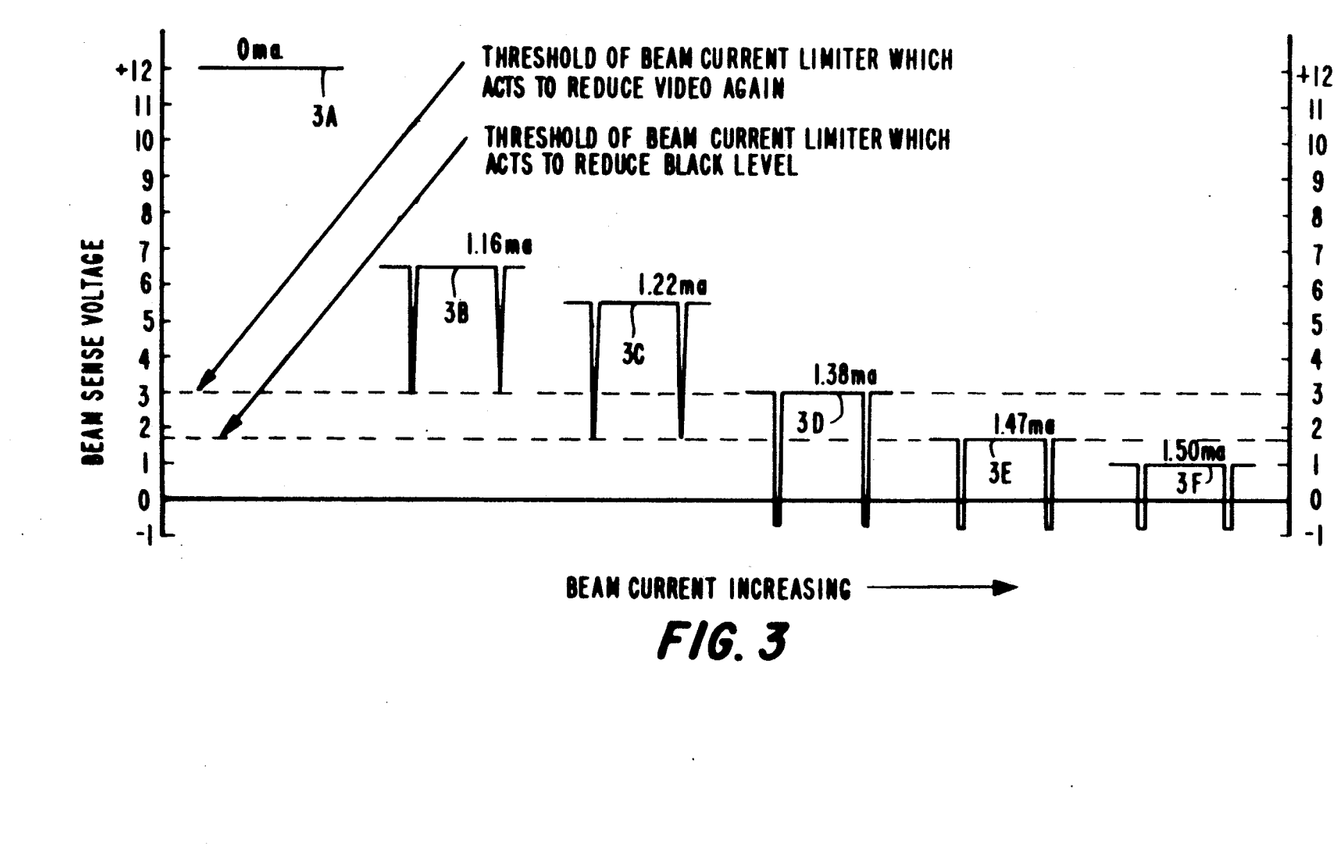
FIG. 3 is a graph illustrating beam sense voltage waveforms for selected values of beam current.

FIG. 3 illustrates typical beam sense voltages for several different levels of beam current. When beam current is 0 milliamps, as shown by waveform 3A, protective diode D1 conducts and prevents the beam sense voltage from rising above approximately +12 volts. As beam current increases, current is diverted from the diode D1 until, at a current on the order of approximately 850 microamps, the diode ceases to conduct. When beam current flows, the beam sense voltage has one value during active picture time and a significantly lower value for a few microseconds during horizontal scan retrace.

The beam sense voltage at a current of approximately 1.16 milliamps (ma) is shown in waveform 3B. At currents exceeding this value, conduction occurs in transistors Q1 and Q2 (initially during the negative spike) and the consequent reduction in voltage at the collector of transistor Q1 acts to reduce video gain. The onset of pix limiter action to reduce video gain would be more abrupt if the spikes were not present, but the less abrupt reduction in video gain that occurs with them normally is acceptable. Brightness limiter action to reduce black level, however, should not begin until significant reduction in video gain has taken place, and then should act rapidly.

The beam sense voltage at a current of approximately 1.22 milliamps is shown in waveform 3C. At currents exceeding this value, undesirable conduction would occur in transistors Q5 and Q6 during the negative spikes, with consequent action by the brightness limiter to reduce black level if the beam sense voltage were applied directly to the base of transistor Q4, instead of being filtered by the action of resistor R4 and capacitor C2. Such premature action to reduce black level is typical of prior art circuits. Waveforms 3D and 3E show the beam sense voltage at currents of approximately 1.38 milliamps and 1.47 milliamps respectively. For waveform 3F, the baseline voltage is already below the threshold, and the effect of the spikes is not a significant concern. When the negative spikes are prevented from causing conduction in transistors Q5 and Q6, the beam limiter structure formed by transistors Q1 and Q2 can conduct heavily and act to reduce video gain substantially, before any action is taken to reduce black level. As shown in FIG. 4, brightness, or black level, control reduction begins almost as soon as picture, or video gain, control reduction without the filter, whereas with the filter brightness control reduction is delayed until significant picture control reduction has occurred.

In the context of the circuit shown in FIG. 2, biasing transistor Q5 only moderately below Q1 should cause the brightness limiter to operate when the pix control circuit has reduced video gain as much as is possible and voltage Vs falls further as beam current increases further. However, the negative pulses (spikes) during retrace cause the brightness limiter to conduct at lower beam current levels than desired, unless transistor Q5 is biased much below the transistor of Q1. However, it is not practical to bias transistor Q5 much below the level of transistor Q1, as the brightness limiter would not be sufficiently effective. The signal processor 78, for example, the filter formed by resistor R4 and capacitor C2, substantially eliminates the AC component (negative spikes) from the signal Vs. The effective control range is therefore significantly extended before beam current limiting by brightness reduction takes place.

The effect of the negative spikes can also be inhibited by controlling propagation of the beam sense control voltage signal to the brightness limiter and/or the pix limiter, for example, by a suitable gate circuit. FIG. 6 illustrates the circuit shown in FIG. 2, as modified to include a signal processor in the form of a gate circuit 77. The gate circuit 77 comprises a transistor Q7, resistors R16 and R17 and diode D3. Diode D3 has a cathode coupled to the emitter electrode of transistor Q5 and an anode coupled to one terminal of resistor R16 and to the emitter electrode of transistor Q7. The collector electrode of transistor Q7 is coupled to the supply voltage +11.2 volts. The base electrode of transistor Q7 is connected to one terminal of resistor R17 and forms an input to the gate circuit. The other ends of resistors R16 and R17 are coupled to ground. The circuit shown in FIG. 6 operates substantially identically to that shown in FIG. 2, except for the influence of gate circuit 77. The filter network comprising resistor R4 and capacitor C2 has been omitted, so that the same beam sense signal is an input to the pix limiter circuit 70 at the base electrode of transistor Q2 and to the brightness limiter 76 at the base electrode of transistor Q6.

Transistor Q7 is normally turned off, but is turned on during horizontal retrace by flyback pulses applied to its base electrode. When the transistor Q7 is turned on, diode D3 becomes forward biased and raises the voltage level at the emitter of transistor Q5 above the voltage level at the base electrode of the transistor Q5, turning transistor Q5 off. This prevents transistor Q5 from conducting responsive to conduction of transistor Q6 under the influence of the negative spikes in the beam sense voltage. The brightness limiter 76 is free to operate as described previously during trace. The auto contrast control 24 is not affected by gate circuit 77, and so continues to operate during retrace as well as during trace.

The use of a different gate circuit is shown in FIG. 7. The circuit shown in FIG. 7 differs from those shown in FIGS. 1, 2 and 5, in so far as a brightness modulator has not been included. The beam sense voltage developed at the junction of resistors R1 and R2 and diode D1 is applied to the base electrode of transistor Q8, which inverts the beam sense voltage. The inverted beam sense voltage developed at the collector electrode of transistor Q8 is applied as an input to the base electrodes of transistors Q9 and Q10. Transistors Q9 and Q10 are shown as NPN transistors. Transistor Q9 is a pix limiter which generates a component of the pix control voltage as an output on its collector electrode. The other components are generated by the manual contrast control and the auto contrast control. Transistor Q10 generates a brightness control voltage as an output on its collector electrode. Resistors R18 and R19 may be on the order of a few kilohms, and may be identical in value, although they need not be identical. Resistors R20, R21 and R22 may be selected to enable operation at thresholds which correspond to the circuits shown in FIGS. 2 and 5, although this need not necessarily be the case. For the values shown, transistor Q8 begins to conduct when the beam sense voltage applied to its base electrode falls more than approximately $V_{BE}$ of transistor Q8 below +11.3 volts. As transistor Q8 begins to conduct, the voltage at its collector electrode begins to rise. When the voltage at the collector electrode of transistor Q8 rises above approximately $V_{BE}$ of transistor Q9, transistor Q9 begins to conduct. When transistor Q9 begins to conduct, the pix control voltage begins to fall, which effects a reduction in video gain. The emitter of transistor Q10 is so biased that when the voltage at the collector electrode of transistor Q8 increases to approximately 1.3 volts in excess of $V_{BE}$ of transistor Q10, transistor Q10 begins to conduct and effect a reduction of the black level. Gate transistor Q11 is normally turned off, but is turned on during horizontal retrace, for example by flyback pulses applied to its base electrode or by pulses which are in timed relationship with the flyback pulses. When transistor Q11 is turned on, it pulls down the voltage signal applied to the bases of transistors Q9 and Q10, assuring that transistors Q9 and Q10 will be turned off during retrace, and effectively preventing propagation of the beam sense voltage signal when the characteristic negative spikes appear in the beam sense voltage signal. The auto contrast control 24 is not affected by operation of transistor Q11.

The auto contrast control and the pix limiter circuit control beam current levels over different parts of a first and relatively wide range of values during which time the brightness modulator, if present, compensates for all undesirable changes in the brightness level due to changes in the video gain responsive to the pix control voltage. As beam current levels reach an extended threshold of unsafe values, in a second range of values, the brightness limiter becomes effective to lower the brightness level markedly to prevent damage and picture degradation from beam current overload. A signal processor for the beam current sense voltage signal prevents premature operation of the brightness limiter.

What is claimed is:

1. A video control circuit, comprising:
   means for developing a beam current representative signal related to a video signal and susceptible to inclusion of a noise component during retrace;
   first means for controlling in amplitude a first image characteristic of the video signal as the beam current representative signal, including the noise component, varies;
   second means for controlling in amplitude a second image characteristic of the video signal as the beam current representative signal varies; and,
   means for inhibiting operation of the second controlling means responsive to the noise component of the beam current representative signal, the first controlling means becoming operative at a first threshold level of the beam current representative signal different from a second threshold level at which the second controlling means becomes operative.

2. The circuit of claim 1, wherein the inhibiting means comprises an AC integrating filter coupled to the beam current representative signal developing means and the second controlling means.

3. The circuit of claim 1, wherein the first image characteristic is contrast.

4. The circuit of claim 1, wherein the second image characteristic is brightness.

5. The circuit of claim 1, wherein the second controlling means can generate a further control signal responsive to the noise component and the inhibiting means comprises switch means operable in timed relationship to flyback pulses for preventing propagation of the further control signal.

6. A video control circuit, comprising:
   means for developing a first beam current control signal related to picture intensity of a video signal and characterized by certain noise;
   means for removing the certain noise and thereby developing a second beam current control signal;
   a contrast control circuit responsive to at least one of the first and second beam current control signals in a first range of beam current operating values for controlling contrast of the video signal; and,
   a brightness limiter responsive to the second beam current control signal in a second range of beam current operating values beyond the first range of operating values for reducing brightness of the video signal.

7. The circuit of claim 6, wherein the removing means comprises an AC filter coupled between the beam current control signal developing means and the brightness limiter.

8. The circuit of claim 7, wherein the AC filter comprises a resistive-capacitive network.

9. A video control circuit, comprising:
   means for developing a beam current control signal related to picture intensity of a video signal and characterized by certain noise occurring during retrace;
   a brightness limiter responsive to the beam current control signal for reducing brightness of the video signal; and
   means operable during retrace for inhibiting operation of the brightness limiter responsive to the beam current control signal.

10. The circuit of claim 9, wherein the operation inhibiting means is operable during retrace for inhibiting propagation of the beam current control signal to the brightness limiter.

11. The circuit of claim 10, wherein the operation inhibiting means comprises switched gating means for the beam current control signal operable in timed relationship to flyback pulses.

12. A video control circuit, comprising:
   means for developing a first beam current control signal related to average picture intensity of a video signal and characterized by certain noise;
   means for removing the certain noise and thereby developing a second beam current control signal;

a contrast control circuit responsive to a signal related to peak values of the video signal corresponding to beam current operating values in a first range;

a contrast limiter circuit responsive to at least one of the first and second beam current control signals in a second range of beam current operating values for reducing contrast of the video signal; and, a brightness limiter responsive to the second beam current control signal in a third range of beam current operating values for reducing brightness of the video signal.

13. The circuit of claim 12, wherein the removing means comprises an AC filter coupled to the beam current control signal developing means and to the brightness limiter.

14. The circuit of claim 13, wherein the AC filter comprises a resistive-capacitive network.

15. The circuit of claim 12, further comprising a brightness control circuit responsive to the contrast control and brightness limiter circuits.

16. A video control circuit, comprising:
means for developing a beam current control signal related to picture intensity of a video signal and characterized by certain noise occurring during retrace;
a brightness limiter responsive to the beam current control signal for reducing brightness of the video signal; and
switched means operable during retrace for inhibiting operation of the brightness limiter responsive to the beam current control signal.

17. The circuit of claim 16, wherein the switched means is operable during retrace for inhibiting propagation of the beam current control signal to the brightness limiter.

18. The circuit of claim 17, wherein the switched means comprises switched gating means for the beam current control signal operable in timed relationship to flyback pulses.

19. A video control circuit, comprising:
means for developing a beam current control signal related to picture intensity of a video signal, the beam current control signal being characterized by certain noise related to generation of flyback pulses during retrace;
means coupled for receiving the beam current control signal and for inhibiting propagation of the certain noise;
a first control circuit responsive to the beam current control signal during trace for controlling contrast of the video signal in a first range of beam current operating values; and,
a second control circuit responsive to the beam current control signal during trace in a second range of beam current operating values beyond the first range of operating values for reducing brightness of the video signal.

20. The circuit of claim 19, wherein the inhibiting means comprises an AC filter coupled to the beam current control signal developing means and to the brightness limiter.

21. The circuit of claim 20, wherein the AC filter comprises a resistive-capacitive network.

22. A video control circuit, comprising:
means for developing a beam current control signal related to picture intensity of a video signal and characterized by certain noise occurring during retrace;
a brightness limiter responsive to the beam current control signal for reducing brightness of the video signal; and
switched gating means operable during retrace for inhibiting operation of the brightness limiter.

23. The circuit of claim 22, wherein the switched gating means inhibits propagation of the beam current control signal during retrace.

24. The circuit of claim 22, wherein the switched gating means is operable in timed relationship to flyback pulses.

25. A control circuit, comprising:
means for developing a beam current representative signal related to a video signal;
first AC filtering means having a once filtered beam current representative signal as an output;
second AC filtering means coupled in cascade with the first AC filtering means and having a twice filtered beam current representative signal as an output;
first means for controlling in amplitude a first image characteristic of the video signal responsive to the once filtered beam current representative signal; and,
second means for controlling in amplitude a second image characteristic of the video signal responsive to the twice filtered beam current representative signal.

26. The circuit of claim 25, wherein said first and second controlling means respond to different ranges of said beam current representative signal.

27. The circuit of claim 25, wherein said first controlling means responds to said beam current representative signal at a lower threshold than said second controlling means.

28. The circuit of claim 25, wherein one of said image characteristics is contrast and the other of said image characteristics is brightness.

29. The circuit of claim 25, wherein said first image characteristic is contrast and said second image characteristic is brightness.

30. A control circuit, comprising:
means for developing a beam current representative signal related to a video signal;
first AC filtering means having a once filtered beam current representative signal as an output;
second AC filtering means coupled in cascade with the first AC filtering means and having a twice filtered beam current representative signal as an output;
first means for controlling in amplitude an image characteristic of the video signal in one sense when the once filtered beam current representative signal exceeds a first threshold; and,
second means for controlling in amplitude said image characteristic of the video signal in an opposite sense when the twice filtered beam current representative signal exceeds a second threshold.

31. The circuit of claim 30, wherein said first and second controlling means respond to different ranges of said beam current representative signal.

32. The circuit of claim 30, wherein said image characteristic is brightness.

33. A control circuit, comprising:
means for developing a beam current representative signal related to a video signal;

means for reducing in amplitude an image characteristic of the video signal when the beam current representative signal exceeds a predetermined threshold; and, means for inhibiting propagation of the beam current representative signal during retrace.

34. The circuit of claim 33, wherein the image characteristic is brightness.

35. A control circuit, comprising:

means for developing a beam current representative signal related to a video signal and being susceptible to inclusion of a noise component;

means for providing a first control signal having an amplitude which varies as the amplitude of the beam current representative signal varies and which is also susceptible to inclusion of the noise;

first means for controlling in amplitude a first image characteristic of the video signal in response to the first control signal;

means for providing a second control signal in response to the first control signal, the second control signal varying in amplitude as the beam current representative signal varies in amplitude, when the amplitude of the beam current representative signal exceeds a threshold;

means for inhibiting the second controlling means from responding to the noise component; and, second means for controlling in amplitude a second image characteristic of the video signal in response to the second control signal.

36. The circuit of claim 35, wherein the image characteristics are contrast and brightness.

37. The circuit of claim 35, wherein the first image characteristic is contrast and the second image characteristic is brightness.

* * * * *